No. 835,623. PATENTED NOV. 13, 1906.
C. E. C. KINNEY.
PHOTOGRAPHY.
APPLICATION FILED MAY 27, 1897.
2 SHEETS—SHEET 1.
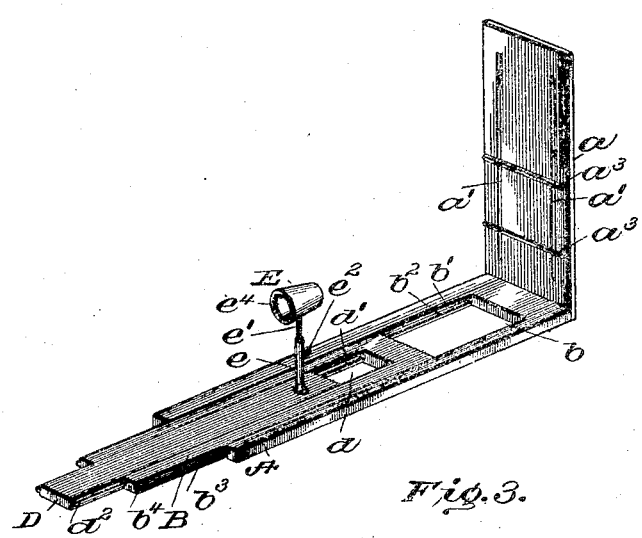
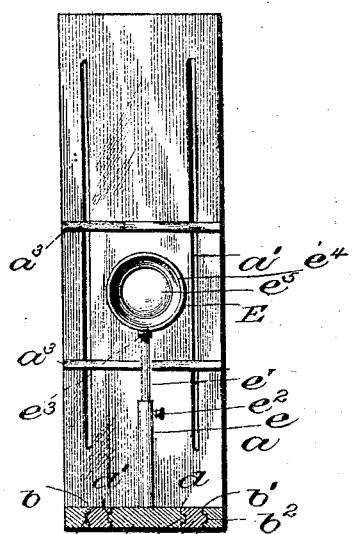
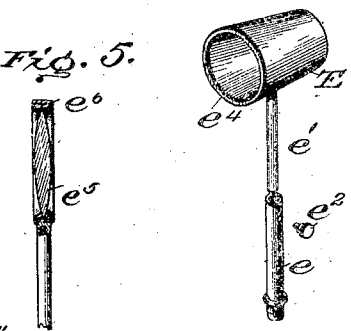
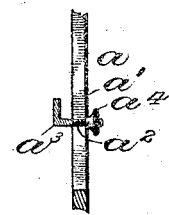
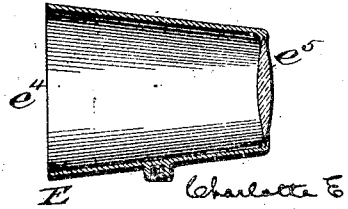
Witnesses
Inventor
Charlotte E. C. Kinney
By Wm. S. Hodges
Attorney No. 835,623. PATENTED NOV. 13, 1906.
C. E. C. KINNEY.
PHOTOGRAPHY.
APPLICATION FILED MAY 27, 1897.
2 SHEETS—SHEET 2.
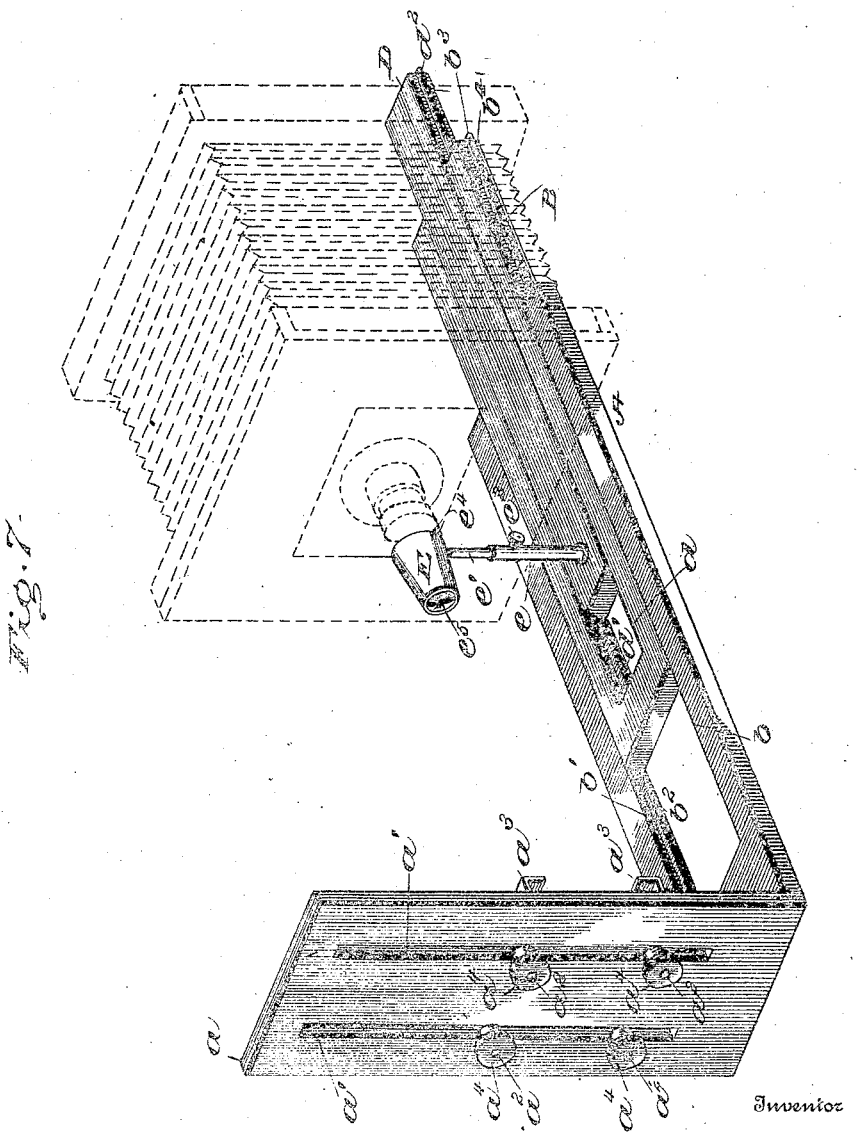

UNITED STATES PATENT OFFICE.

CHARLOTTE E. C. KINNEY, OF NEW YORK, N. Y.

PHOTOGRAPHY.

No. 835,623.  Specification of Letters Patent.  Patented Nov. 13, 1906.

Application filed May 27, 1897. Serial No. 638,418.

*To all whom it may concern:*

Be it known that I, CHARLOTTE E. C. KINNEY, of New York, in the county of New York and State of New York, have invented certain new and useful Improvements in Photography; and I do hereby declare the following to be a full, clear, and exact description of the invention, such as will enable others skilled in the art to which it appertains to make and use the same.

My invention relates to certain useful improvements in photography.

With the apparatus and means now in use for photographing the size of the image of the object photographed is subject to the limitation of the capacity of the photographic lens used.

My object is to produce, in connection with a photographic lens, magnification of the image of the object being photographed and photographing said image by the photographic lens.

My invention consists, broadly, in using with any camera and its lens a magnifying device or lens interposed between the object to be photographed and the plate as a means for producing and photographing an image of the object to be photographed enlarged beyond that produced by the photographic lens. I carry out this object by interposing between the object to be photographed and the camera-plate an enlarger or magnifier to produce an enlargement or magnification of the image of the object to be photographed. This enlarger or magnifier should be adjustable so as to produce at will different degrees of magnification of the image. Preferably I use an adjustable enlarging-lens and interpose that lens between the photographic lens and the object.

I will now describe an embodiment of my invention, illustrated in the accompanying drawings, and then point out the invention in the claims.

Figure 1 is a view in perspective illustrating my improved apparatus. Fig. 2 is a transverse sectional view. Fig. 3 is an enlarged detail view. Fig. 4 is a longitudinal sectional view of the latter. Fig. 5 shows a modification. Fig. 6 is a detail sectional view. Fig. 7 is an enlarged view of my improved apparatus in operative position with a camera, the latter being indicated in dotted lines.

Referring to the drawings, A designates a base adapted to rest upon a table or the like, the same being provided at one end with a vertical member $a$, provided with longitudinal slots $a'$, in which fit threaded studs $a^2$, extending rearwardly from right-angular strips $a^3$, between which the object is secured. Said strips are held in position by binding-nuts $a^4$, working on the threaded portions of studs $a^2$ and binding against the edges of slots $a'$. The strips $a^3$ extend entirely across the board $a$, and by rendering them adjustable with relation to each other the object—say a picture of any size or dimensions—may be readily secured in position.

The base A is provided with a central longitudinal cut-out $b$, the longitudinal edges $b'$ of which are grooved at $b^2$ to receive correspondingly-reduced portions $b^3$, formed in the longitudinal edges $b^4$ of a member B. Said latter member is also cut out at $d$ and provided with grooves or guideways $d'$, adapted to receive the reduced edges $d^2$ of a second sliding member D. To the member D is secured a vertical tubular standard $e$, adapted to receive a rod $e'$, which is adjustable longitudinally therein, the same being retained in its adjusted position by means of a set-screw $e^2$. The upper end $e^3$ of said rod is threaded and adapted to engage a conical casing E, which is open at its rear end $e^4$, a lens $e^5$ being secured in the forward end thereof. The size of this lens and casing may be varied at will, according to the size it is desired to make the enlargement of the image of the object photographed. The casing may be entirely dispensed with and the lens secured in an ordinary rim $e^6$, as illustrated in Fig. 5.

If the apparatus be used to photograph a photograph or print in practice, the photograph or print is first secured between the strips $a^3$ of the upright $a$ and the height of the lens $e^5$ adjusted to correspond therewith. The sliding members of base A are then adjusted until the desired focus is obtained, it frequently being necessary to move said lens within two or three inches of the object, the distance varying according to the character of the lens employed. The camera to be employed, which may be of any size, form, or make, is then placed in such position as to photograph the image now seen magnified. In this manner the image of the object is magnified by the lens $e^5$ before reaching the camera-lens and the magnified image thus obtained is photographed. Prints may be taken therefrom, as with the ordinary negative, and thus the number of copies is only limited by the life of the negative itself.

The advantages of my invention will be at once apparent to those skilled in the art to which it appertains. It will be specially observed that an enlargement of the image of the object to be photographed may be made and said enlarged image photographed in any place and with any light by which an ordinary photograph can be taken.

In this specification I have described only one of the many forms that may be employed for carrying out my invention.

I do not intend to limit myself to the location shown for the magnifier, as it may be placed in other positions, the only limitation as to its position being that it must be placed at some point between the object to be photographed and the plate. It will also be obvious that no specially-designed apparatus is necessary, as, for example, the ordinary camera and ordinary reading-glass may be placed upon a table, the glass being supported by any means that may be convenient, fully embodies my invention. I do not, therefore, wish to be limited to any particular form of apparatus or means for supporting the same or to any particular location of the magnifying device or lens, as my invention consists, broadly, in using a magnifying device with any camera and its lens as a means for producing and photographing an image of the object to be photographed enlarged beyond that produced by the photographic lens, and it will be seen from the foregoing description that my invention enables one with the same camera to photograph on the plate a larger image of the object than could be done without my invention. This can be carried to the extent of making the photograph larger than the object photographed.

I claim as my invention—

1. The combination with a photographic lens, of an adjustable enlarger placed between the object and the plate, and producing at will different degrees of magnification of the image.

2. The combination with a photographic lens, of an adjustable enlarging-lens placed between the object and the plate, and producing at will different degrees of magnification of the image.

3. The combination with a photographic lens, of an enlarger placed between the object and the plate.

4. The combination with a photographic lens, of an enlarging-lens placed between the object and the plate.

5. The combination with a photographic lens, of an adjustable enlarger placed in front of it and producing at will different degrees of magnification of the image.

6. The combination with a photographic lens, of an adjustable enlarging-lens placed in front of it, and producing at will different degrees of magnification of the image.

7. The combination with a photographic lens, of an enlarger placed in front of it.

8. The combination with a photographic lens, of an enlarging-lens placed in front of it.

9. As a means for producing and photographing an enlarged image of the object to be photographed, the combination with a photographic camera and its lenses, of means whereby the image thrown upon the plate is larger than the object photographed without regard to the relative distance of the plate from the lens.

10. An attachment for photographic cameras consisting of an independent magnifying device other than the camera-lenses so arranged that the image thrown upon the plate is larger than the object photographed without regard to the relative distance of the plate from the lens, substantially as set forth.

11. The combination with a camera and lens of a supplemental lens so arranged that the image thrown upon the plate is larger than the object photographed without regard to the relative distance of the plate from the lens, substantially as set forth.

12. The herein-described apparatus for producing and photographing an enlarged image of the object to be photographed, comprising a horizontally-adjustable standard, and an open-ended casing vertically adjustable in said standard and having a lens in one end thereof adapted to be interposed between a camera and a picture to be enlarged, substantially as set forth.

13. The herein-described apparatus for producing and photographing an enlarged image of the object to be photographed, comprising a base-board having a vertical member, a standard horizontally adjustable in said base-board, a casing carried by said standard and capable of vertical adjustment therein, and a lens carried by said casing and adapted to be interposed between a camera and a picture to be enlarged, substantially as set forth.

14. The herein-described apparatus for producing and photographing an enlarged image of the object to be photographed, comprising a base-board having a vertical member, a series of grooved boards or members capable of longitudinal adjustment in said base-board and with relation to each other, a standard secured to one of said adjustable boards or members, and a lens carried by said standard and adapted to be interposed between a camera and a picture to be enlarged, substantially as set forth.

15. The herein-described apparatus for producing and photographing an enlarged image of the object to be photographed, comprising a base or board, right-angular strips carried thereby and adjustable with relation to each other, and a lens mounted on the base and capable of adjustment with relation to said base or board, as and for the purpose set forth.

16. The herein-described apparatus for producing and photographing an enlarged image of the object to be photographed, comprising a base or board having slots therein, right-angular strips having threaded studs projected through said slots, binding-nuts working on said studs, and a lens mounted on the base and capable of adjustment with relation to said base or board, substantially as set forth.

In testimony whereof I have signed this specification in the presence of two subscribing witnesses.

CHARLOTTE E. C. KINNEY.

Witnesses:
A. LANSING BAIRD,
DAVID C. GRANT.